United States Patent [19]

Bartman et al.

[11] 4,408,018

[45] Oct. 4, 1983

[54] ACETOACETATE FUNCTIONALIZED POLYMERS AND MONOMERS USEFUL FOR CROSSLINKING FORMULATIONS

[75] Inventors: Benjamin Bartman, Maple Glen; Graham Swift, Blue Bell, both of Pa.

[73] Assignee: Rohm and Haas Company, Philadelphia, Pa.

[21] Appl. No.: 437,710

[22] Filed: Oct. 29, 1982

[51] Int. Cl.³ .............................................. C08L 33/14
[52] U.S. Cl. .................... 525/300; 525/303; 525/304; 525/305; 525/153
[58] Field of Search ........................ 525/300, 304, 305

[56] References Cited

U.S. PATENT DOCUMENTS 2,101,107 12/1937 Strain ................................ 525/305
3,201,373 8/1965 Kaizerman ........................ 260/79.5

*Primary Examiner*—Carman J. Seccuro
*Attorney, Agent, or Firm*—Michael B. Fein; Donald C. Simpson

[57] ABSTRACT

An acetoacetate moiety may be introduced into polymers and used via Michael Reaction for crosslinking with alpha, beta-unsaturated esters.

9 Claims, No Drawings

ACETOACETATE FUNCTIONALIZED POLYMERS AND MONOMERS USEFUL FOR CROSSLINKING FORMULATIONS

BACKGROUND OF THE INVENTION

The common thermosetting compositions contain aminoplasts, for example, metholated melamines, isocyanates or epoxides, as crosslinking agents. There are problems associated with each of these crosslinking agents. In general, the aminoplasts require baking conditions for cure; during the bake, aminoplasts often evolve formaldehyde or other toxic volatiles. While isocyanates will crosslink under ambient conditions, they are toxic and expensive. The epoxides require some heat to induce cure, but, in general, epoxide crosslinked systems tend to deteriorate on subjection to outdoor exposure. Alkyd systems can be cured under ambient conditions, but also have poor weatherability. Societal, economic and governmental pressures require an ambient curing, non-toxic, inexpensive crosslinking system for use in coatings, textiles and plastics industries. The increased demand for low energy curing has further intensified the need for a crosslinking system which can be effected at ambient conditions.

THE INVENTION

The present invention takes advantage of the Michael Reaction by which certain enols or enolates add across the double bonds of alpha, beta-unsaturated ketones and esters. The reaction of acetoacetic ester with an acrylic acid ester in the presence of a strong base illustrates the Michael Reaction. The two carbonyl groups adjacent to the methylene increase the acidity of the methylene protons to produce an enolate ion in the presence of a strong base such as sodium methoxide:

$$CH_3-\underset{\underset{O}{\|}}{C}-CH_2-\underset{\underset{O}{\|}}{C}-OC_2H_5 \underset{\text{Strong base}}{\rightleftarrows} CH_3-\underset{\underset{O}{\|}}{C}-\underset{(-)}{CH}-\underset{\underset{O}{\|}}{C}-OC_2H_5 \quad (1)$$

$$CH_3-\underset{\underset{O}{\|}}{C}-\underset{(-)}{CH}-\underset{\underset{O}{\|}}{C}-OC_2H_5 + CH_2=CHCOC_2H_5 \; CH_3-\underset{\underset{O}{\|}}{C}-\underset{\underset{CH_2CH_2COC_2H_5}{|}}{CH}-\underset{\underset{O}{\|}}{C}-OC_2H_5 \quad (2)$$

The present invention is based on the discovery that the acetoacetate moiety may be introduced into polymers and used via the Michael Reaction for crosslinking with alpha, beta-unsaturated esters. The preferred method of introducing the acetoacetate group into polymers involves the use of the acetoacetic ester of hydroxyethyl methacrylate (HEMA, hereafter) and hydroxyethyl acrylate (HEA, hereafter), which esters will be referred to for simplicity as HEMA-AA and HEA-AA respectively. The acetoacetate functionality may be obtained by reactions involving diketene.

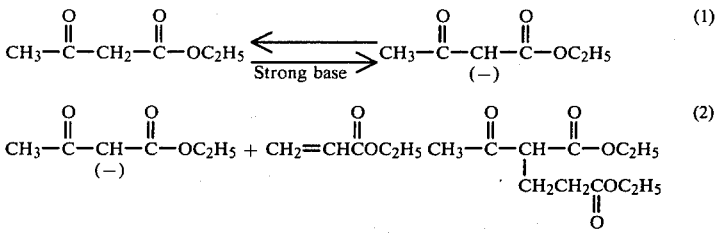

In the foregoing equation, R may be a polymerizable moiety or it may be an established backbone. Thus, where ROH represents HEMA or HEA, the resulting product is a monomer, HEMA-AA or HEA-AA respectively. These monomers can then be copolymerized with other polymerizable monomers to introduce the acetoacetate moiety into the polymer chain. Where R is already a polymer chain, then, of course, nothing further is needed to prepare the polymer for crosslinking by way of the Michael Reaction.

As was noted, a strong base is required to catalyze the crosslinking reaction. Typically, these include bases such as potassium hydroxide, tetrabutyl ammonium hydroxide, potassium amylate, sodium methoxide, potassium ethoxide and other alkyli metal derivatives of alcohol, and quaternary ammonium bases. These are generally utilized in the form of alcohol solutions. The amines, such as triethylamine and dimethylaminoethanol are generally not sufficiently strong to catalyze the crosslinking reaction under ambient conditions but require heat to effect crosslinking in a reasonable period of time.

The organic materials suitable for use in crosslinking polymers containing the acetoacetate moiety are polyacrylates having at least two groups of the structure

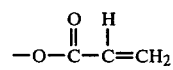

pendantly attached to an organic radical selected from the group consisting of alkyl, aryl, alkyl-aryl and polymeric radicals. The preferred polyacrylate compounds are formed from reacting organic polyols with acrylic acid. Examples of suitable compounds include ethylene glycol diacrylate. 1,4-butanediol diacrylate, Bisphenol A diacrylate, diethylene glycol diacrylate, pentaerythritol triacrylate, pentaerythritol tetraacrylate, trimethylolpropane triacrylate, polyethylene glycol diacrylate, Bisphenol A diglycidal ether diacrylate and ethoxylated Bisphenol A diacrylate.

Besides the polyacrylates, examples of other organic materials are the following:

(1) reaction products of polyisocyanates, preferably diisocyanates such as toluene diisocyanate or isocyanate-terminated prepolymers with hydroxyl-containing acrylic esters such as 2-hydroxyethylacrylic esters such as 2-hydroxyethylacrylate or hydroxypropyl acrylate;

(2) reaction products of an epoxy resinous material such as those described above with acrylic acid;

(3) transetherification reaction products of polymeric polyols such as hydroxyl-containing acrylic resins, polyester polyols including polyesters derived from lactones and polyether polyols with N-alkoxymethyl acrylamides.

For the purposes of the present invention, the illustrative cross-linking monomer is trimethylolpropane triacrylate (TMPTA).

The polymerization reactions used for introducing HEMA-AA or HEA-AA into polymer chains is essentially the same as that used normally in the polymerization of acrylate and methacrylate monomers. Example 1 illustrates the preparation of a HEMA-AA copolymer with styrene (⅓ mol ratio) by the usual solvent polymerization methods. The HEMA-AA was prepared by simple reaction between HEMA and diketene with appropriate cooling and the reaction was completed in about an hour. The HEMA-AA was stable to hydrolysis at 140° F. for one week under slightly acidic conditions and was immiscible with water.

EXAMPLE 1

To a three-neck flask with heating mantle, stirrer, addition funnel, nitrogen sparge and temperature controller, was added 327.9 grams of butyl Cellosolve (2-butoxy ethanol) and the temperature raised and maintained at 140° C. To the hot solvent, a solution of 214.2 grams of 2-acetoacetoxyethyl methacrylate, 312.4 grams of styrene and 21.06 grams of Lupersol 70 (75% t-butyl peracetate), was added dropwise over a period of four hours. When the addition was complete the solution was maintained at 140° C. for 30 minutes, and then an additional charge of 2.10 grams of Lupersol 70 was added. Heating was continued for 30 minutes at 140° C. before cooling. The resin had the following properties:

| | |
|---|---|
| Appearance: | Clear, pale yellow |
| Varnish color scale: | 1+ |
| Viscosity (Brookfield #4 spindle, 30 RPM): | 14,600 CPS |
| Solids (2hrs @ 125° C.): | 59.9% |
| $M_n$ (Gel permeation chromatography): | 3,500 |
| $M_w$ (Gel permeation chromatography): | 12,600 |
| Calculated average degree of polymerization: | 28.60 |
| Average calculated acetoacetate functionality: | 6.7 |

EXAMPLES 2 through 6

The resin of Example I, a 3 to 1 mol ratio styrene/HEMA-AA in butylcellosolve, was blended (1 to 1 mol ratio) with DRH-370, an acrylated bisphenol A - glycidyl ether produced by Shell Chemical Company, and with a basic catalyst. These catalysts are described in Table I. The hardness of coatings formed from these materials after one week of ambient cure or baking are also shown. The control examples without base were too soft to measure hardness accurately.

TABLE I

| Example | Base | Knoop Hardness Number After One Week Cure Ambient | Baked(*) |
|---|---|---|---|
| 2 | Sodium Methoxide @ 5 mol % | 0.28 | 10.8 |
| 3 | Potassium t-Butoxide @ 5 mol % | — | — |
| 4 | Potassium Hydroxide @ 5 mol % | 0.31 | 10.1 |
| 5 | Magnesium Dimethoxide @ 5 mol % | — | — |
| 6 | Magnesium Dimethoxide @ 10 mol % | — | — |

(*)140° F. for 30 minutes.

EXAMPLES 7 through 12

Following normal polymerization techniques for solution polymers and emulsion polymers, a number of acrylic polymers were prepared containing the acetoacetate moiety obtained by polymerizing HEMA-AA as a monomer with the specified monomers system. The polymer compositions are set forth in Table II.

TABLE II

| | COMPOSITION WEIGHT % | | | | | | |
|---|---|---|---|---|---|---|---|
| Ex. | BA | MMA | Styrene | MAA | HEMA—AA | Solvent | Total Solids |
| 7 | 25 | 45 | 20 | | 10 | xylene | 57.9% |
| 8 | 30 | 40 | 20 | | 10 | xylene | 58.2% |
| 9 | 45 | 45 | | | 10 | cellosolve acetate | 48.6 |
| 10 | 25 | 45 | 20 | | 10 | cellosolve acetate | 49.0 |
| 11 | 30 | 40 | 20 | | 10 | butyl cellosolve | 49.0 |
| 12 | 89 | | | 1 | 10 | water (emulsion) | 47.8 |

EXAMPLES 13 and 14

The polymers of Examples 7 and 8 were crosslinked with trimethylolpropane triacrylate. Tetrabutylammonium hydroxide in methanol (25%) and potassium hydroxide in ethanol (25%) were used as the catalysts for the crosslinking reaction. The potassium hydroxide solution was prepared by dissolving the hydroxide in absolute ethanol and filtering the resulting solution to produce a clear solution. Both clear film and pigmented films were prepared and the properties studied with particular accent on hardness and print resistance. The results established that a minimum of ½% by weight of catalyst is required and that 50% of the stoichiometric amount of crosslinker is required to obtain ambient crosslinking. Hardness development and print resistance were found to equal commercial urethanes and to exceed certain commercially available alkyd film controls that were employed in the tests. The Weather-O-Meter and humidity resistance tests were also comparable to the commercial controls. Other tests established that crosslinking activity decreased in formulas which contained only catalyst or only crosslinker with the polymer after being maintained for 10 days at 140° F.

EXAMPLES 15 through 19

The polymer composition of Example 11 was blended with trimethylolpropane triacrylate in stoichiometric proportions. Different Michael addition base catalysts were incorporated in the amount specified in Table III. The pot life i.e., the time before gelation occurs under ambient conditions, is provided in Table III.

TABLE III

| Catalyst | % | Pot Life |
|---|---|---|
| None | — | — |
| Dimethylaminoethyanol | 5 | >72 hours |
| Tetrabutylammonium hydroxide | 0.5 | 3 hours |
| Tetrabutylammonium hydroxide | 1 | 89 minutes |
| Tetrabutylammonium hydroxide | 5 | 11 minutes |

EXAMPLES 20 through 23

The resin of Example 1 was mixed in a 1 to 1 mol ratio with DRH-370 as described in Examples 2 through 6. A basic catalyst was added, also as in Examples 2 through 6, but in this instance the base was first mixed with a complexing amount of an 18 crown 6 ether, an 18 member ring consisting of alternating —O— and —CH₂CH₂—. The bases employed and the levels of application are shown in Table IV as are the results of the test.

TABLE IV

| Ex. | Base | Ambient | Baked, 140° F. for 30 Min. |
|---|---|---|---|
| 20 | Potassium t-Butoxide @ 5 mol % | 0.37 | 14.1 |
| 21 | Magnesium Dimethoxide @ 5 mol % | — | 4.88 |
| 22 | Sodium Methoxide @ 5 mol % | 0.46 | 13.6 |
| 23 | Potassium Hydroxide @ 5 mol % | 0.46 | 14.9 |

It is to be understood that changes and variations may be made without departing from the spirit and scope of the invention as defined by the appended claims.

We claim:

1. A method for effecting the crosslinking of polymers comprising the steps of introducing into an acrylate polymer backbone a plurality of pendant acetoacetate moieties, mixing said polymer with a crosslinking quantity of at least one polyacrylate having at least two groups of the structure

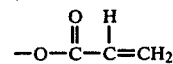

pendantly attached to an organic radical selected from the group consisting of alkyl, aryl, alkyl-aryl and polymeric radicals, and with a strong base catalyst effective to initiate a Michael Reaction and effecting reaction between said pendant acetoacetate moieties and said polyacrylate.

2. A method in accordance with claim 1 wherein said polymer is an acrylate polymer and in which said acetoacetate moiety is introduced by copolymerization of a member of the group consisting of HEMA acetoacetate and HEA acetoacetate during the polymerization of the monomers forming said acrylate polymer.

3. A method in accordance with claim 2 wherein said polyacrylate is trimethylolpropane triacrylate.

4. A method in accordance with claim 3 wherein the catalyst is selected from the group consisting of an alcohol solution of tertrabutyl-ammonium hydroxide and an alcohol solution of potassium hydroxide.

5. A crosslinked polymer when produced by the method of claim 1.

6. A crosslinked polymer when produced by the method of claim 2.

7. A crosslinked polymer when produced by the method of claim 3.

8. A crosslinked polymer when produced by the method of claim 4.

9. A crosslinked polymer in accordance with claim 2 wherein said acrylate polymer is a styrene-acrylate copolymer.

* * * * *